Patented July 11, 1939

2,165,393

UNITED STATES PATENT OFFICE 2,165,393

DECORATED MATERIAL AND A PROCESS FOR MAKING SAME

Leon Lilienfeld, Vienna, Austria

No Drawing. Application July 14, 1934, Serial No. 735,298. In Great Britain July 17, 1933

6 Claims. (Cl. 91—68)

This invention relates to materials suitable for the production of effects belonging to the class of pearly, silky, nacreous or iridescent effects and to the process for the production thereof.

The invention pertains more particularly to materials intended for the production of pearly, silky, nacreous or iridescent effects and to articles having at least in part a pearly, silky, nacreous or iridescent appearance which materials contain as basic substances cellulose or derivatives or compounds of cellulose, such as a suitable ether or ester of cellulose.

Heretofore, pearly, silky, nacreous or iridescent effects have been produced in such materials by incorporating with, or distributing within, them either finely divided metallic powders or pigments displaying a pearl-like or metallic or silky lustre, such as powdered mica, certain scintillating metal salts of silky or silvery appearance or fish scale essence or some other crystallised substances.

The present invention is based on the surprising discovery that it is possible to produce pearly, silky, nacreous or iridescent effects by means of cellulose or its conversion or oxidation products, or by means of suitable derivatives or compounds, for example ethers or esters of cellulose not by distributing within them substances having a pearly, silky, nacreous or iridescent appearance, but simply by transforming solutions of cellulose or of suitable derivatives or compounds of cellulose into a lather and employing the thus obtained lather for decorating, coating or impregnating or printing any pliable or rigid materials or articles and drying the lather (before or after precipitation if desired or necessary).

The present invention is based on the surprising discovery that it is possible to impart a pearly, silky, nacreous or iridescent appearance to any rigid or pliable material or article by means of solutions of cellulose or its conversion or oxidation products or by means of solutions of suitable derivatives or compounds such as ethers or esters of cellulose or of its conversion products not by distributing within the solutions substances having a pearly, silky, nacreous or iridescent appearance, but by simply transforming the said solutions into lather and applying the said lather, for instance by coating or impregnating or printing or otherwise applying, to any pliable or rigid material and then treating the said material to solidify the lather without materially destroying the structure of the lather and leaving the pearly, silky, nacreous or iridescent appearance on the surface thereof. In carrying the invention into effect, care is taken to preserving the lathery condition of the material throughout all stages of the process.

Consequently, my invention consists in a novel decorated material and a process for making same.

It further consists in a novel basic material for the manufacture of pearly, silky, nacreous or iridescent articles.

My invention therefore consists in novel ways and means for producing pearly, silky, nacreous or iridescent materials.

Other objects and advantages of the present invention will be apparent to persons skilled in the art from the following description.

It will be noticed that, whereas heretofore pearly, silky, nacreous or iridescent effects and materials have been produced by disseminating throughout certain colloids or binders finely divided inorganic or organic substances of pearly, silky, iridescent or metallic appearance, at the same time leaving the colloids or binders physically unchanged, I introduce a distinctive novelty in altering the physical structure of appropriate colloids and binders in such a manner that they acquire a highly attractive, pearly, silky, nacreous or iridescent appearance without the necessity of having any pearly, silky, nacreous or iridescent substance incorporated therewith.

In other words: Whereas the pearly, silky, nacreous or iridescent effects hitherto produced are solely due to pearly, silky, nacreous or iridescent pigments or substances embedded in certain colloids, the pearly, silky, nacreous or iridescent effects produced according to my present invention are due to a change of the physical structure of the colloids, i. e. are produced by the colloids themselves.

As mentioned above, the change of the physical structure of the colloids in question consists in the phenomenon that, in the present process, the solution of the colloid is changed into a three- or multiphase structure, one of which being probably a solid phase, in which structure macroscopic or microscopic or ultra-microscopic gas bubbles are separated from one another by micronic or submicronic thin liquid skins.

Now, my hypothesis, to which however the invention is in no way limited, is that, when according to the present invention the lather, i. e. the three- or multiphase structure is solidified for example by optionally precipitating or coagulating the cellulosic material followed by drying (which, if desired, may be preceded by washing), or by direct drying which, in the event of by-products being present in the lather may be followed by coagulation or precipitation, washing and drying in such a manner that the infinitesimal liquid skins separating the infinitesimal gas bubbles are not destroyed, they remain in the final product in the form of innumerous infinitesimal shiny lamellae consisting of a desiccated structureless colloid, which lamellae in coaction with the infinitesimal hollow spaces scintillate or iridesce through reflection of light.

In other words: The novel material intended for the production of pearly, silky, nacreous iridescent effects is a three- or multiphase structure consisting of a desiccated structureless colloid.

In practice, the present invention is carried into effect (1) By preparing the basic material intended for the decoration or manufacture of articles which are to have a pearly, silky, nacreous or iridescent effect, i. e. by transforming a solution or paste of cellulose or of a derivative or compound of cellulose into a lather and (2) By converting the thus obtained lather into coverings or coatings wholly or partly covering the inside or outside of pliable or rigid articles of any kind in such a manner as to preserve the foamy structure of the lather, particularly, however, of its surface through all operations and in the finished coating or covering.

Among others, a suitable way of preserving the foamy character of the lather is to prevent its surface from coming into contact with appliances that are capable of exerting mechanical pressure on the surface of the lather, for example rollers or the like. Consequently, it is advisable in the carrying out of the present invention to use only such apparatus or machines which do not exert any substantial pressure on, or otherwise disturb, the lather during the step of applying it to rigid or pliable supports or during the steps of precipitating or coagulating it respectively, or during drying etc.

As parent materials for the present invention there may be used for instance a suitable solution of cellulose. As examples of such solutions, to which however the present invention is not limited, I name the following: A solution of celluose, for example in cuprammonia solution, or in a zinc chloride solution or in a mixture of caustic alkali solution with guanidine or with urea or thiourea or another suitable member of the group of ammonia derivatives of $CO_2$ or $CS_2$, or in a solution of a thiocyanate, for example calcium thiocyanate, or a suitable solution of a conversion or oxidation or degradation product of cellulose, or of mercerised cellulose, in short of any of the cellulosic materials proposed for being employed in the industry of solutions of cellulose, or a solution of a suitable derivative or compound of cellulose, such as a suitable ether or ester of cellulose or of a solution of a suitable N-substituted thiourethane of cellulose, for example a phenyl thiourethane of cellulose, or of cellulose xanthate (viscose)—which expression is intended to include xanthates of cellulose or of its conversion, degradation or oxidation products, in short of all cellulosic materials that have been proposed as parent materials for the manufacture of cellulose xanthate (viscose) or other cellulose derivatives— or of another suitable cellulose derivative containing a CSS-group, for instance of a cellulose xantho-fatty acid, or of a product resulting from the contacting of cellulose xanthate (viscose) with a halogen derivative of a di- or polyvalent alcohol e. g. a halogenhydrin or with another etherifying reagent, or of a solution of a product obtainable by xanthation of a suitable cellulose ether or another oxy-organo compound of cellulose, namely one or more xanthates of oxy-organo compounds of cellulose.

In this case the prefix "poly" is used in the generic sense to include "di-".

Particularly suitable for the present invention are such ethers of cellulose as are soluble or swellable in water at room temperature or in water at temperatures below room temperature. These compounds differ from all other cellulose compounds in that their solutions are readily transformable into voluminous lathers by themselves, i. e. also in absence of any other substances (such as saponin etc.) capable of creating lather. In this respect, the water-soluble or water-swellable ethers of cellulose are even superior to proteins or their degradation products, such as peptones or albumoses, the latter colloids being surpassed by the aforementioned types of cellulose ethers also in respect of pliability of the films, coatings or layers of any kind produceable from the respective solutions. Hence, the water-soluble or water-swellable ethers of cellulose may be employed in the present invention by themselves, i. e. in the form of solutions which may or may not contain other colloids, but which are free from additional substances capable of creating lather, or they may be employed in the present invention in the form of solutions containing other substances capable of creating lather or they may be used in the present invention as substances creating lather in solutions of colloids which, by themselves, are either incapable or little capable of being transformed into lather without the aid of substances capable of creating lather (such as cellulose xanthate (viscose) or solutions of cellulose in cuprammonia or other solvents or the like).

Another advantage of the water-soluble or water-swellable ethers of cellulose is the brilliancy and lustre of the skins, coatings or layers of any kind or lamellae or the like obtainable by using their solutions, which lustre considerably promotes the pearly, silky, nacreous or iridescent appearance of the article produced from, or decorated with, lathers produced from solutions of water-soluble or water-swellable cellulose ethers.

The solutions or pastes of the parent cellulosic bodies may be transformed into a lather by mechanical means, for example by violent agitation or beating of the solution or paste or by blowing into, or through, the solution or paste, a very violent current of air or of another gas, in short by any one of the well-known methods for producing lather or foam. Since however in some instances it is difficult by purely mechanical means to transform the solutions or pastes in question into stiff and voluminous lathers, I prefer in such cases to effect the transformation into lathers of the solutions or pastes in the presence of substances capable of creating lather, such as saponins, or proteins or degradation products of the latter, such as peptones or albumoses and the like, hereinafter embraced in the term "lather forming assistant".

A quite exceptional position among the cellulose derivatives is to be attributed to such alkyl derivatives of cellulose as are soluble in caustic alkali solution, but insoluble in water. The particular usefulness of the alkali-soluble alkyl derivatives of cellulose for the present process is due to the fact that the alkaline solution of most of them have pronounced tendency towards forming gas bubbles and, what is more important, towards retaining them for a long time. Consequently, they are capable even in absence of substances creating lather to form highly voluminous, stiff and stable lather. These alkyl derivatives of cellulose are also very useful in all cases in which it is desired to use substances creating lather, the advantage being the quite exceptional voluminosity and stability of the lather obtained.

The expression "alkyl" used in the specification and claims is, wherever the context permits, intended to include alkyl-, hydroxyalkyl- and substituted alkyl- (such as aralkyl) groups.

The second phase of the invention that is the working up into coatings and coverings of any kind of the lathers prepared from the solutions or pastes of cellulosic bodies, for example the mechanical part, such as the applying of the lathers to the materials to be decorated, for example by coating, impregnating, sizing, printing, painting, or the like, or the methods of separating the solids of the lather by desiccating or, where feasible or desirable, by precipitating or, if derivatives containing the CSS-group are used as parent materials, the desulphurising methods, or the finishing and drying methods and the like, may lean to some extent on the well known and often described methods of producing artificial structures, such as film, bands, plastics, artificial leather, floor coverings, book cloth or decorating layers wholly or partly covering pliable or rigid articles of any kind, such as wood, glass, ceramics, plastics of any kind, textiles, paper, leather and so on.

It is to be understood that the paramount condition for success is to conduct all operations in such a manner as to preserve the lathery condition of the material and especially the surface of said lather, throughout all stages of the process without materially destroying the structure of the lather and while leaving a coating which after final drying will exhibit the pearly, silky, nacreous or iridescent appearance on its surface.

So far as is compatible with the character and nature of the solutions, if desired, pigments having pearly, silky, nacreous or iridescent appearance, such as fish scale essence or finely powdered mica or finely divided bronze powders or the silvery variety of mercurous chloride or bismuth-oxychloride or antimony-oxychloride or the like may be added to the solutions or pastes, before or during or after their transformation into the lather.

The products of the present invention may be coloured either in the mass, that is to say by incorporating dye-stuffs or coloured pigments, such as lake-dyes with the solution or lather or the like or by dyeing the finished articles.

I am aware of the fact that in my application Ser. No. 618,804 I have described a process in which textile materials are coated, impregnated, filled, dressed, mixed, printed or the like by means of solutions of cellulose or cellulose derivatives or cellulose compounds which, before being applied to the textile material, have been transformed into a lather. Since, however, until the time of having made the discovery underlying the present invention, I executed the process laid down in my application Ser. No. 618,804 by means of methods, apparatus and machines which cause a material sinking in of the lather into the textile fibre, that is to say, the absorption of at least a great part of the lather by the textile fibre, the invention described in my application Ser. No. 618,804 was incapable of teaching me that the application of the lather characteristic of the present invention to textiles or any other materials in such a manner that throughout all operations the lather is not allowed substantially to sink into the support, would produce articles displaying pearly, silky, nacreous or iridescent effects.

Consequently, the discovery underlying the present invention is novel even over the process described in my application Ser. No. 618,804.

The term "ethers" used in the description and claims is, wherever the context permits, intended to include simple and mixed alkyl, hydroxyalkyl, or aralkyl ethers of cellulose or of conversion products or derivatives or compounds, (for example esterified ethers or etherified esters).

The term "cellulose" used in the description and claims is, wherever the context permits, intended to include cellulose, its conversion and oxidation products, such as cellulose hydrate, hydrocellulose, oxycellulose, acidcellulose or the like.

The term "cellulosic body" used in the description and claims is, wherever the context permits, intended to include cellulose, its conversion and oxidation products and also metathetic derivatives and compounds, such as simple or mixed ethers or esters or ether-esters of cellulose or of its conversion products, and also additive derivatives or compounds of cellulose, such as xanthates of cellulose or of its conversion or oxidation products or of cellulose derivatives, such as ethers or esters.

It is to be understood that, wherever the context permits, in the specification and claims the term "applying" includes any manner of application to the support in question, whether by manual or mechanical means customary for decorating, coating, covering, painting, dressing, filling, impregnating, sizing, printing, or weighting, so long as the latter is not destroyed nor its surface substantially injured.

The expression "textile material" used in the specification and claims includes any spun or woven textile fibres, whether animal or vegetable (for example, flax, linen, hemp, ramie, jute, wool and particularly cotton, as well as artificial fibres of any kind in the form of yarn, staple fibre or fabrics consisting of, or containing artificial fibres) in the form of pure fabrics, or in the form of mixed fabrics or in the form of yarn in skeins, cops, or warps.

The expression "not more than very slightly soluble" used in the specification and claims is of course intended to include "insoluble" also.

The expression "alkali-soluble cellulose ethers" used in the description and claims is intended to include such cellulose ethers as are soluble in caustic alkali solution at room temperature and at any temperature below room temperature, but insoluble or only scarcely soluble in water, such cellulose ethers as are insoluble in caustic alkali solution at room temperature and in water, but soluble in caustic alkali solution below room temperature and also such cellulose ethers as are only soluble in caustic alkali solution below 0° C., but insoluble in water.

The expression "water-soluble cellulose ether" or "cellulose ether which is at least partially soluble in water" used in the specification and claims is intended to include such cellulose ethers as are soluble in water at room temperature or above room temperature or below room temperature and such cellulose ethers as are only soluble in water substantially below room temperature.

It is to be understood that the foregoing detailed description is given merely by way of illustration and that many variations may be made therein without departing from the spirit of my invention.

What I claim is:

1. As a new article of manufacture, a material having at least in part a pearly, silky, nacreous or iridescent appearance which is due to a covering on at least a part of said material containing a solidified lather which contains at least one substance selected from the group consisting of cellulose, cellulose compounds and cellulose derivatives, and which appearance is manifest even if it carries no pigment which has a pearly, silky, nacreous or iridescent appearance.

2. As a new article of manufacture, a textile material having on at least a part of its area, a pearly, silky, nacreous or iridescent appearance which is due to a covering on such part of its area, which covering comprises a desiccated lather which contains at least one substance selected from the group consisting of cellulose, cellulose compounds and cellulose derivatives, and which covering is practically free from any pigment having a pearly, silky, nacreous or iridescent appearance.

3. As a new article of manufacture, a material having upon at least a part of its surface, a pearly, silky, nacreous or iridescent appearance which is due to a covering on said part of its surface, said covering containing a desiccated cellulose ether which has the physical structure of a lather and which structure, of itself irrespective of any pigment contained therein, exhibits a pearly, silky, nacreous or iridescent appearance.

4. Process for imparting a pearly, silky, nacreous or iridescent appearance to at least a portion of the surface of a material, which comprises the step of applying to at least a portion of the surface of said material a lather made from a solution of at least one substance selected from the group consisting of cellulose, cellulose compounds and cellulose derivatives, which lather after solidification and drying will exhibit the above mentioned appearance, and thereafter treating the said material to solidify the lather while at least a part of said lather is still on the surface of said material, and without materially injuring the structure of the surface portion of the lather and without preventing the said appearance on the surface thereof.

5. Process for imparting a pearly, silky, nacreous or iridescent appearance to at least part of the surface of a material, which comprises applying to at least a part of the surface of said material, a lather made from a solution of at least one substance selected from the group consisting of cellulose, cellulose compounds and cellulose derivatives and which lather upon precipitation and drying exhibits the said appearance, then while at least a part of said lather is on the said surface, treating the said material with an agent capable of precipitating the cellulosic body contained in the lather, without materially destroying the structure of the surface portion of the lather and without preventing the attainment, upon drying, of said appearance on the surface thereof.

6. Process for imparting a pearly, silky, nacreous or iridescent appearance to at least part of the surface of a material, which comprises applying to the surface of at least a part of said material, a lather made from a solution of at least one xanthate of a cellulosic body, subjecting the material, while carrying the coating of said lather upon its surface, to a regenerating treatment, and subjecting the product to a desulphurizing treatment, and drying, the regenerating treatment being conducted without destroying the surface of said lather on said material.

LEON LILIENFELD.